(12) United States Patent
Bryant et al.

(10) Patent No.: US 9,188,317 B1
(45) Date of Patent: Nov. 17, 2015

(54) STREETLIGHT MOUNTING BASE WITH COLLAR

(71) Applicants: Christopher Michael Bryant, Social Circle, GA (US); Khurram Zeshan Moghal, Senoia, GA (US); Jean Sundin, New York, NY (US); Enrique Peiniger, New York, NY (US)

(72) Inventors: Christopher Michael Bryant, Social Circle, GA (US); Khurram Zeshan Moghal, Senoia, GA (US); Jean Sundin, New York, NY (US); Enrique Peiniger, New York, NY (US)

(73) Assignees: Cooper Technologies Company, Houston, TX (US); Office for Visual Interaction, Inc., New York, NY (US)

( * ) Notice: Subject to any disclaimer, the term of this patent is extended or adjusted under 35 U.S.C. 154(b) by 0 days.

(21) Appl. No.: 14/259,758

(22) Filed: Apr. 23, 2014

Related U.S. Application Data (60) Provisional application No. 61/828,939, filed on May 30, 2013.

(51) Int. Cl.
*E04H 12/22* (2006.01)
*F21V 21/02* (2006.01)
*F21W 131/103* (2006.01)
*F21V 21/00* (2006.01)

(52) U.S. Cl.
CPC ............ *F21V 21/02* (2013.01); *E04H 12/2269* (2013.01); *F21V 21/00* (2013.01); *F16M 2200/08* (2013.01); *F21W 2131/103* (2013.01)

(58) Field of Classification Search
CPC ........ E01F 9/018; E01F 9/0182; F21V 21/00; F21V 21/02; F21W 2131/103; E04H 12/2269; F16M 2200/08

USPC .............. 248/188.1, 346.01, 519, 523; 52/40; 362/431

See application file for complete search history.

(56) References Cited

U.S. PATENT DOCUMENTS

| | | | | |
|---|---|---|---|---|
| 1,939,530 A | * | 12/1933 | Wall .............................. | 362/431 |
| 2,297,916 A | * | 10/1942 | Sauer ............................ | 439/700 |
| 3,311,333 A | * | 3/1967 | Galloway ...................... | 52/295 |
| 3,325,950 A | * | 6/1967 | Pfaff, Jr. ....................... | 52/28 |
| 3,343,322 A | * | 9/1967 | Lurkis et al. .................. | 52/298 |
| 4,154,037 A | * | 5/1979 | Anderson ...................... | 52/296 |
| 5,586,742 A | * | 12/1996 | Carter ........................... | 248/545 |
| 6,240,689 B1 | * | 6/2001 | Haddad et al. ................ | 52/298 |
| 6,299,124 B1 | * | 10/2001 | Reback et al. ................ | 248/519 |
| 7,490,964 B2 | * | 2/2009 | Haddad et al. ................ | 362/431 |
| 7,690,613 B2 | * | 4/2010 | Bowman et al. ......... | 248/346.01 |
| 7,731,383 B2 | * | 6/2010 | Myer ............................. | 362/145 |
| 7,874,126 B2 | * | 1/2011 | Fournier ........................ | 52/843 |
| 2005/0285011 A1 | * | 12/2005 | Harwood ...................... | 248/519 |
| 2006/0109667 A1 | * | 5/2006 | Flaherty et al. ............... | 362/431 |
| 2009/0154178 A1 | * | 6/2009 | Hall ............................... | 362/431 |

* cited by examiner

Primary Examiner — Michael Safavi
(74) Attorney, Agent, or Firm — King & Spalding LLP (57) ABSTRACT

A streetlight mounting system can fix a streetlight pole to a street side surface, such as a slab of concrete or a sidewalk. The system can comprise a base that attaches on one end to the street side surface and on the other end to the streetlight pole. A collar can provide a transition between the base and the streetlight pole. The collar can have a top that is slanted to shed water. The collar can comprise multiple elements that are urged together by clips. The clips and other fasteners that hold the streetlight pole, the collar, and the base together can be hidden from view, with access provided by a door in the base.

18 Claims, 11 Drawing Sheets

STREETLIGHT MOUNTING BASE WITH COLLAR

CROSS REFERENCE TO RELATED APPLICATIONS

This application claims priority to U.S. Provisional Patent Application No. 61/828,939 filed May 30, 2013 in the name of Christopher Michael Bryant and Khurram Zeshan Moghal and entitled "Streetlight Mounting System," the entire contents of which are hereby incorporated herein by reference.

FIELD OF THE TECHNOLOGY

The present technology relates to streetlights and more particularly to a system for mounting a streetlight pole to a horizontal surface.

BACKGROUND

Streetlights are often positioned adjacent or above an area to be illuminated. Utilizing conventional mounting approaches, such streetlights are often cumbersome or inefficient to mount and/or service. Often conventional mounting systems are bulky and/or unsightly and may be prone to ingress of water or other environmental issues.

Improved technology for mounting streetlights in needed. A capability addressing such need, or some other related deficiency in the art, would support economically providing illumination to streets and other areas.

SUMMARY

A streetlight mounting system can comprise a base and a system for mounting a streetlight pole to the base. The base can be fixed to the ground or other appropriate surface near an area to be illuminated. The system for mounting the streetlight pole to the base can comprise fasteners, for example bolts, that fasten the streetlight pole to the base, at least two collar sections, and a clip system for holding the collars together about the pole. A first of the collar sections can extend adjacent a first circumferential portion of the streetlight pole, while a second of the collar sections can extend adjacent a second circumferential portion of the streetlight pole. The clip system can comprise a first clip attached to the first collar section and a second clip attached to the second collar section. The first clip and the second clip can be configured to engage one another to urge the first collar section and the second collar section together about the streetlight pole.

In certain embodiments, the first clip and the second clip can be L-shaped and comprise spring steel, for example spring tempered stainless steel.

In certain embodiments, the first collar section comprises a first groove adjacent the first circumferential portion of the streetlight pole, the second collar section comprises a second groove adjacent the second circumferential portion of the streetlight pole, and the streetlight mounting system further comprises gasket material disposed in the first and second grooves. In certain embodiments, the streetlight mounting system further comprises additional gasket material disposed between the first and second collar sections.

In certain embodiments, the streetlight mounting system comprises a means for locating the collar sections relative to the base. In one example, the base can comprise at least one protrusion, with the first collar section comprising at least one aperture sized to receive the at least one protrusion for aligning the first collar section with the base. The base may further comprise at least one more protrusion, with the second collar section comprising at least one more aperture sized to receive the at least one more protrusion for aligning the second collar section with the base. As another example, the first and second collar sections can comprise a plurality of protrusions with the base comprising a plurality of apertures sized according to the plurality of protrusions for aligning the first and second collar sections with the base.

In certain embodiments, an uppermost portion of the first collar section and an uppermost portion of the second collar section can collectively circumscribe the streetlight pole at an acute angle relative to an axis of the streetlight pole. The acute angle may facilitate shedding rain water.

In certain embodiments, when the streetlight mounting system is in an operational configuration, all fasteners that couple the first collar section, the second collar section, the base, and the streetlight pole together can be hidden from view.

In certain embodiments, a flange on the streetlight pole can bolt to the base.

In certain embodiments, the first collar section and the second collar section can comprise inward facing ribs that enhance structural integrity.

The foregoing discussion of managing streetlight mounting is for illustrative purposes only. Various aspects of the present technology may be more clearly understood and appreciated from a review of the following text and by reference to the drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description, covered by this application, and protected by the accompanying claims.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

A streetlight mounting system can securely mount a streetlight pole in a position adjacent a street or other area to be illuminated. One or more light sources attached to the pole can emit light to provide illumination. The light sources may be based on high energy discharge, incandescent, or light emitting diode technology, for example. The streetlight pole can be mounted in an upright position. In certain embodiments, the streetlight pole can be mounted to tilt or mounted horizontally, for example.

The present technology can be embodied in many different forms and should not be construed as limited to the embodiments set forth herein; rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Technology for mounting streetlights will now be described more fully with reference FIGS. 1-8, which describe representative embodiments of the present technology and illustrate various elements and views of a representative streetlight mounting system.

Figure 1A:
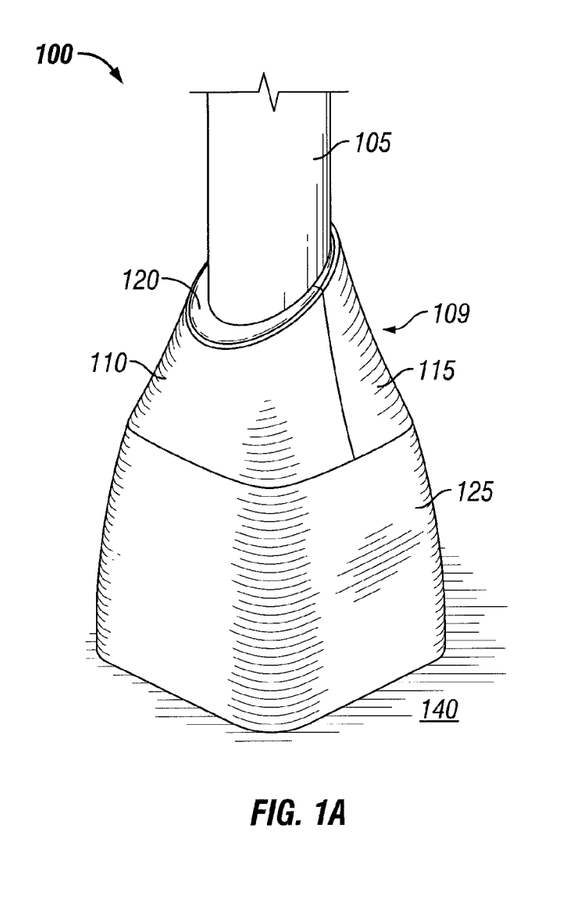
FIGS. 1A and 1B (collectively FIG. 1) illustrate a representative streetlight mounting system in two views according to some example embodiments of the present technology.
Figure 1B:
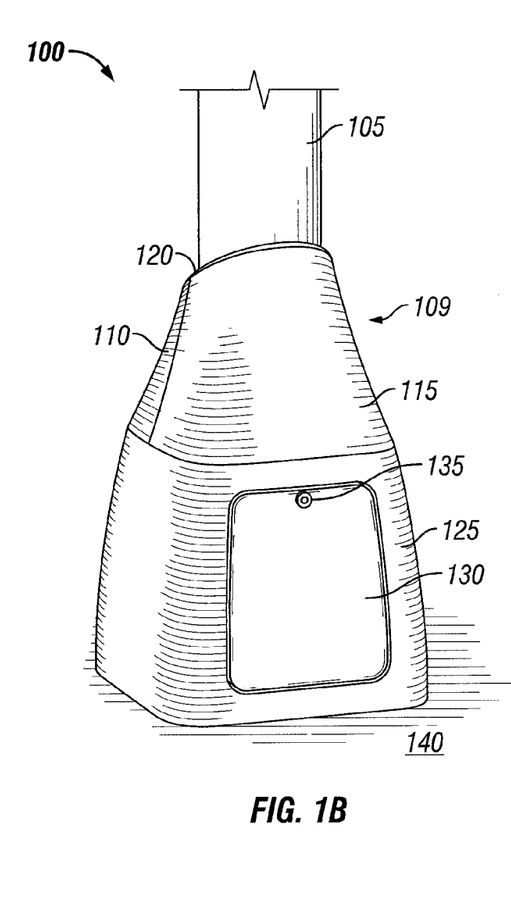

FIGS. 1A and 1B illustrate two views of a representative streetlight mounting system 100. The illustrated street light mounting system 100 comprises a base 125 that is fixed to a surface 140 near an area to be illuminated, a collar 109, and a streetlight pole 105.

Figures 2A, 2B:
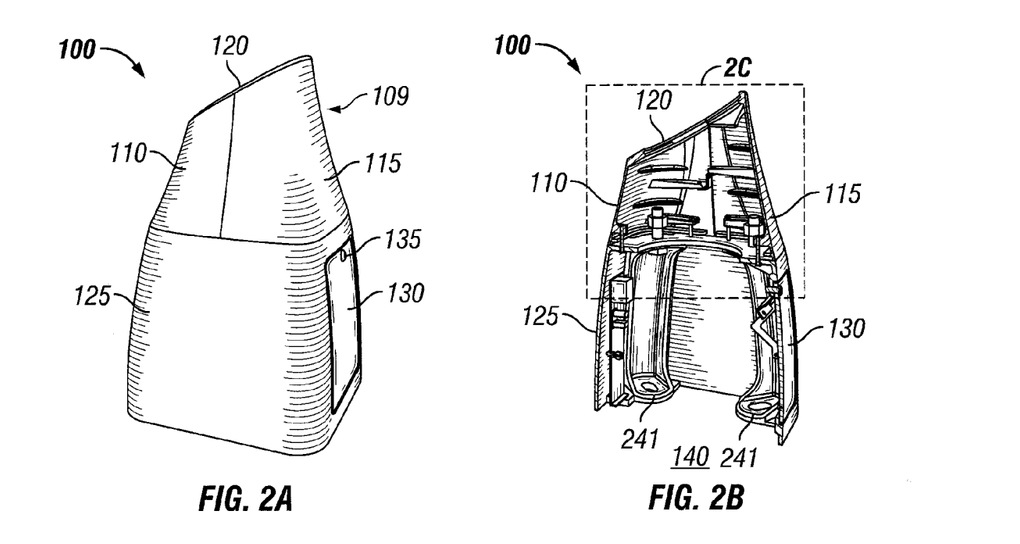
FIGS. 2A, 2B, and 2C (collectively FIG. 2) provide a cutaway view of the streetlight mounting system illustrating representative internal elements according to some example embodiments of the present technology.

The surface 140 to which the base 125 may be mounted may comprise a concrete slab, a sidewalk, or other suitable structure, for example. FIG. 2B, discussed below, illustrates a representative mounting facility.

The collar 109 comprises two collar sections 110, 115 that together circumscribe the pole 105. Other collar embodiments, may have three or four or some other appropriate number of collar sections. In certain embodiments, the collar 109 may be a unitary structure that seamlessly circumscribes the pole 105.

In certain embodiments, the collar sections 110, 115 are formed of cast aluminum or another appropriate metal. However, other materials may be utilized singularly or in combination. In certain embodiments, the collar sections 110, 115 are formed of plastic, fiberglass, or an appropriate composite material, for example.

The uppermost portion 120 or top of the collar sections 110, 115 are angled to facilitate water shedding. In other words, the distal end of the collar 109 is oriented at an acute angle relative to the longitudinal axis of the streetlight pole 105. The resulting angle can promote runoff of rain water and debris.

In a typical installation, the streetlight mounting system 100 can be oriented so that the uppermost portion 120 of the collar 109 is angled toward the street. In this orientation, runoff water tends to flow towards and ultimately into a gutter on the street.

As discussed in further detail below, a system of fasteners holds together the base 125, the collar sections 110, 115, and the pole 105. The fasteners are enclosed within the structure and hidden from external view, but readily accessible via a door 130 on the base 125. Having the fasteners internal to the streetlight mounting system 100 avoids tampering and debris collection and further offers aesthetic benefit. A separate fastener 135 holds the door 130 shut.

In a typical installation, the streetlight mounting system 100 can be oriented so that the door 130 opens away from the street. This orientation facilitates access with the streetlight between the service personnel and the street.

Figure 2C:
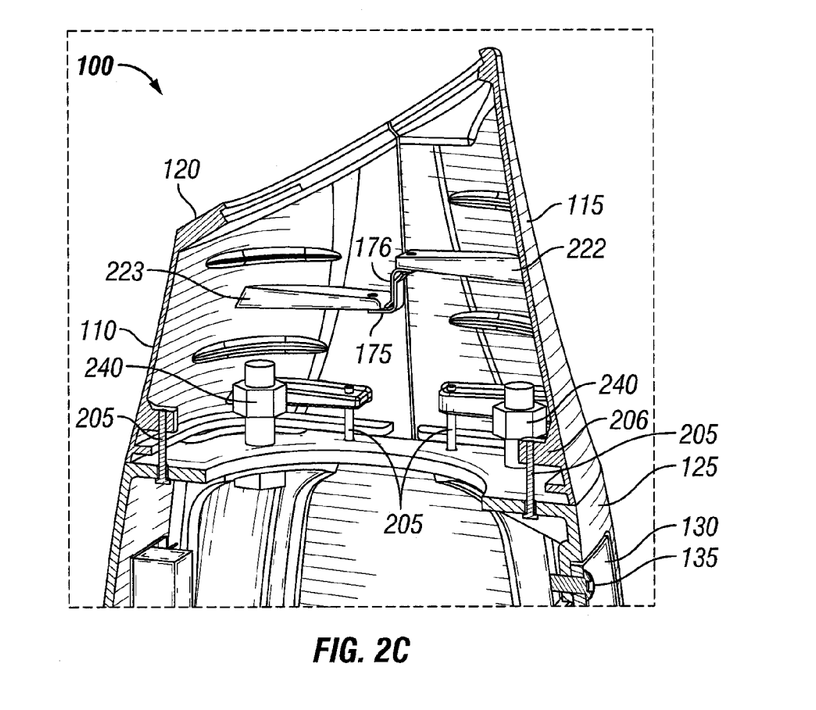

Referring now to FIG. 2, FIG. 2B provides a cutaway view of the streetlight mounting system 100, taken with the streetlight mounting system 100 in the orientation depicted in FIG. 2A, cutting vertically through the two collar sections 110, 115. FIG. 2C provides an expanded view showing internal elements of the collar sections 110, 115.

Each of the collar sections 110, 115 has two attached clips 175, 176. The clip 176 is screwed to the boss 222 on the collar section 115, while the clip 175 is screwed to the boss 223 on the collar section 110. The clips 175, 176 can be made of spring stainless steel or other suitable material, for example. In the illustrated embodiment, each clip 175, 176 is attached in a collar section recess using a single fastener, with the recess preventing rotation of the clip 175, 176 about the axis of the fastener.

As will be further discussed below, the clips 175, 176 of the two collar sections 110, 115 engage one another and urge the collar sections 110, 115 together about the street light pole 105 (as illustrated in FIG. 1).

Collar mounting bolts 205 attach the collar sections 110, 115 to the base 125. In the illustrated example embodiment, the collar mounting bolts 205 extend through holes in the top of the base 125 and screw into threaded holes in bosses 206 of the collar sections 110, 115.

Larger bolts 240 (two shown) attach the streetlight pole 105 to the base 125. The bolts 240 may protrude through and engage a flange (not illustrated) on the lower end of the streetlight pole 105, for example. While depicted with the threaded section portion vertically oriented, in some embodiments, the bolts 240 may be inverted. Additionally, washers may be deployed with the bolts 240.

The lower portion of the base 125 comprises holes 241 for attaching the base 125 to a surface 140 adjacent an area to be illuminated. The base 125 may be mounted to a concrete slab or other structure via bolts or other fasteners (not shown) extending through the holes 241.

Referring now to FIG. 3, FIGS. 3A, 3B, and 3C illustrate assembly views of the streetlight mounting system 100 showing representative locating elements that facilitate alignment of the collar sections 110, 115 to the base 125.

Figure 3A:
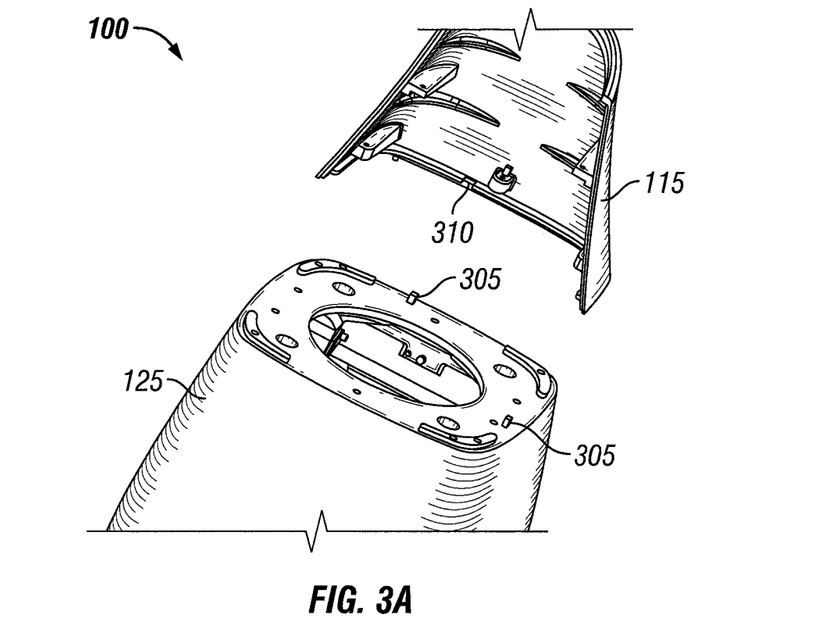
FIGS. 3A, 3B, and 3C (collectively FIG. 3) illustrate assembly views of the streetlight mounting system showing representative locating elements that facilitate alignment according to some example embodiments of the present technology.
Figure 3B:
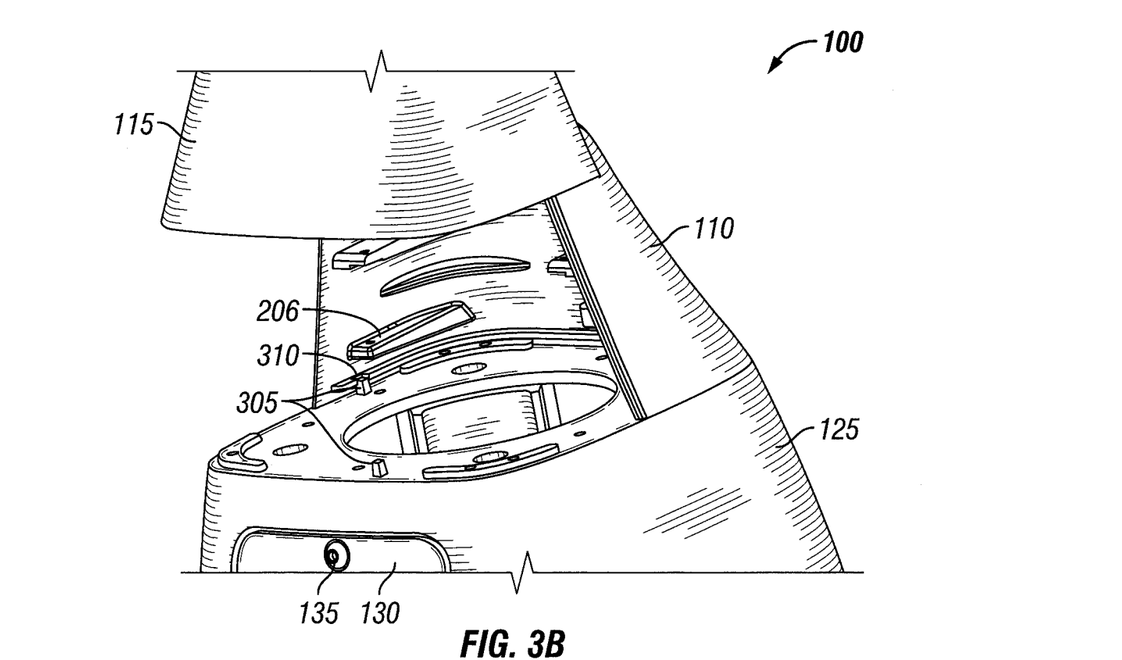

As illustrated, protrusions 305 on the base 125 mate with apertures 310 in the collar sections 110, 115 to facilitate alignment and further to help lock the collar sections 110, 114 in place. In certain embodiments, the protrusions 305 may comprise pins or other locating features.

Figure 3C:
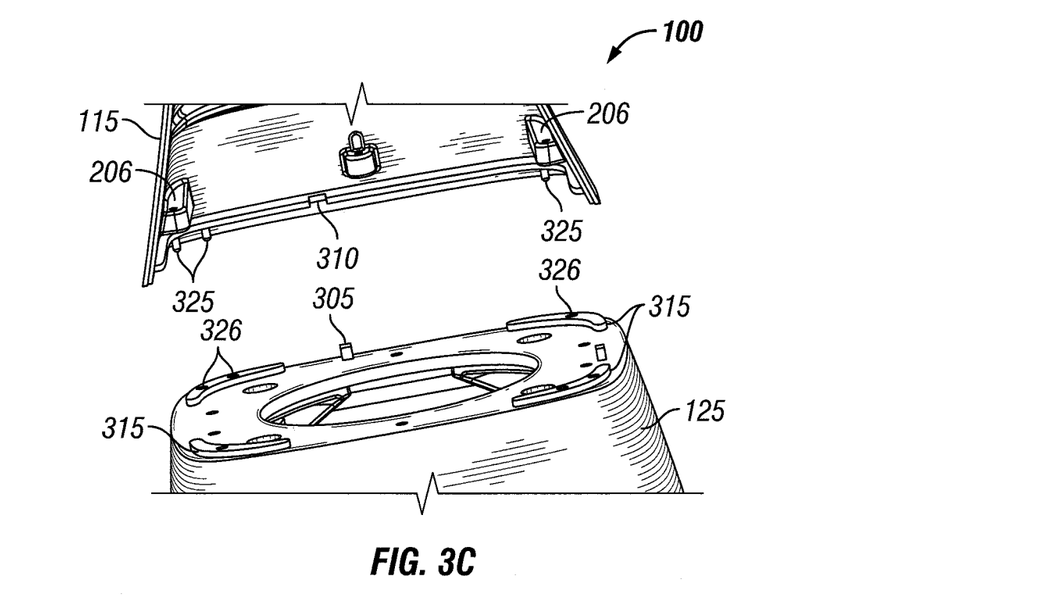

As illustrated in FIG. 3C the collar sections 110, 115 also contain protrusions 325 that mate with apertures 326 in the base 125. In certain embodiments, the protrusions 325 may comprise pins or other locating features. In the illustrated embodiment, the apertures 326 in the base 125 are in raised platforms 315 on the base 125 that further provide structural integrity and alignment.

Figure 4:
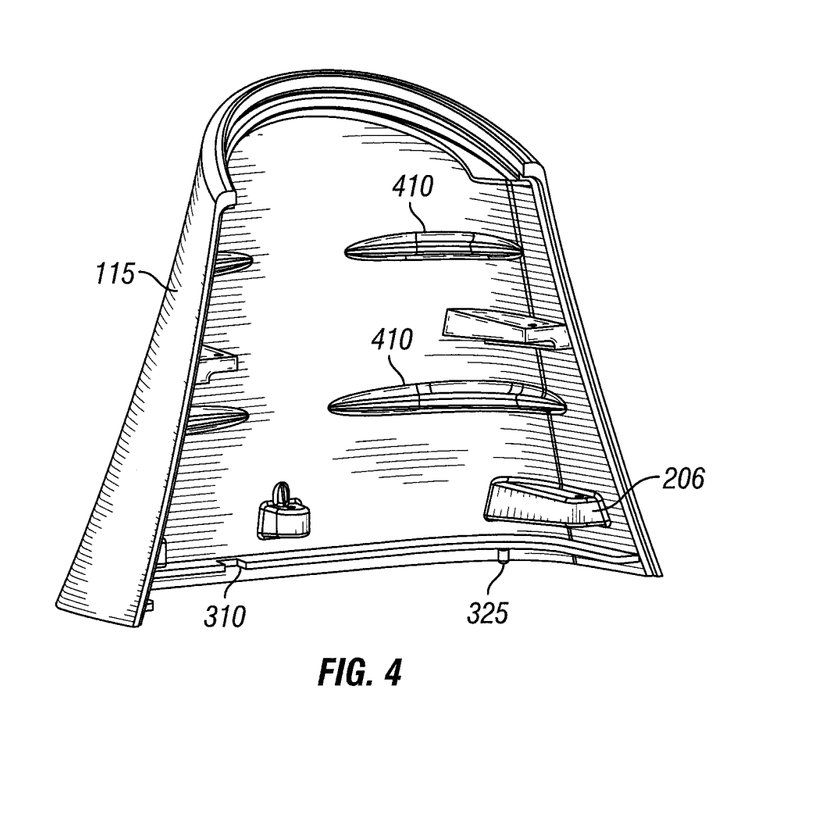
FIG. 4 provides an internal view of a collar of the streetlight mounting system showing ribs that enhance mechanical integrity according to some example embodiments of the present technology.

FIG. 4 provides an internal view of the collar section 115 of the streetlight mounting system 100. In the illustrated embodiment, the collar section 115 has internal ribs 410 that enhance mechanical integrity. In the illustrated embodiment, the internal ribs 410 extend substantially perpendicular to the streetlight pole 105. Thus, in an installation where the streetlight pole 105 is vertical, the internal ribs 410 would be substantially horizontal.

Figure 5A:
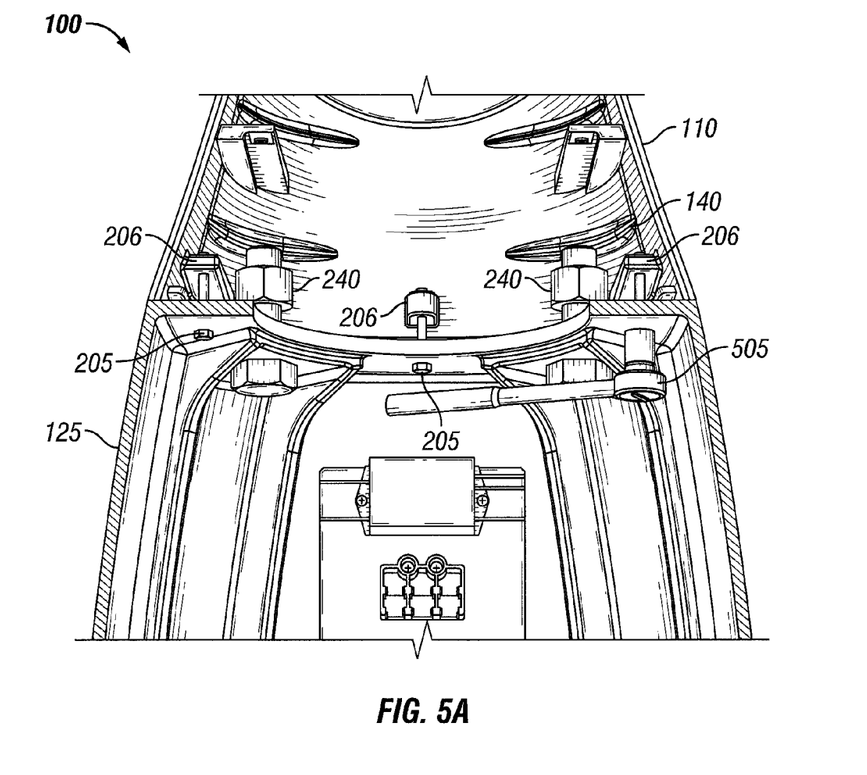
FIGS. 5A and 5B (collectively FIG. 5) provide views of the streetlight mounting system illustrating representative fastening elements according to some example embodiments of the present technology.
Figure 5B:
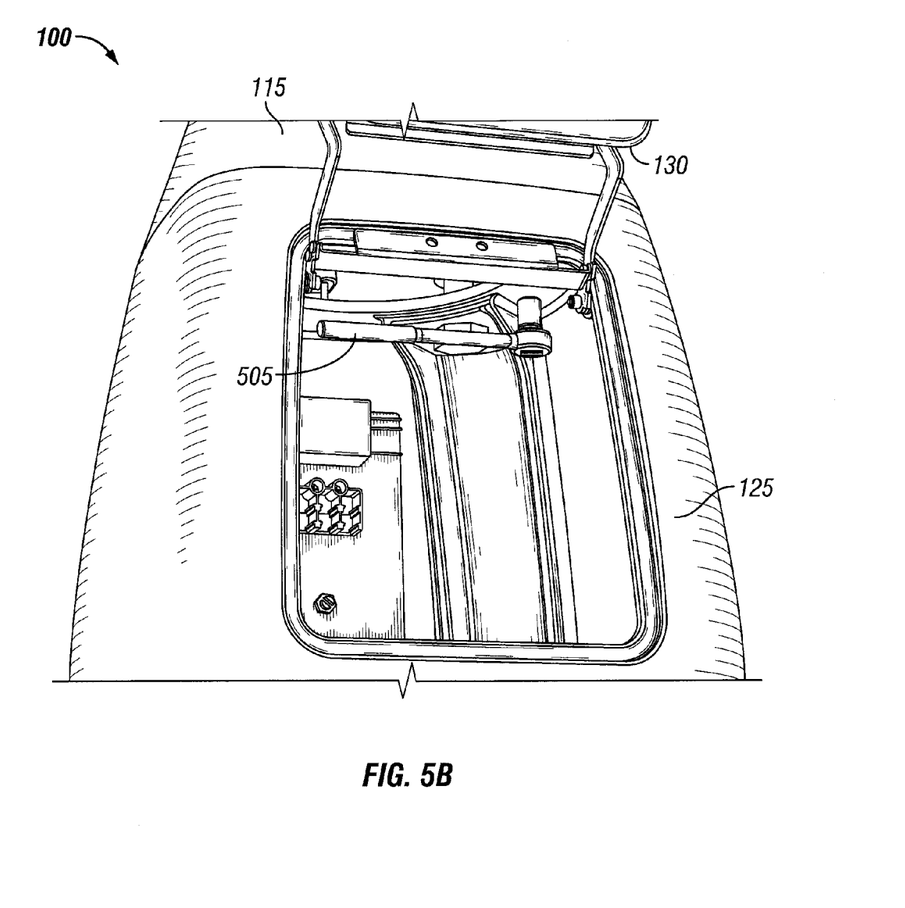

Referring now to FIG. 5, FIG. 5A provides a cutaway view of the streetlight mounting system 100, while FIG. 5B provides a view with the door 130 open. The door 130 provides access for service personnel to the system of fasteners holding the streetlight pole 150, the collar sections 110, and the base 125 together. In the illustrated embodiment, a ratchet wrench 505 inserted through the door 130 readily tightens or loosens the collar mounting bolts 205, which in some embodiments may have associated washers. Accordingly, the fasteners 205 are hidden from view when the door 130 is shut and the streetlight and the streetlight mounting system 100 are in an operational configuration.

An exemplary process for onsite assembly of the street light mounting system will be discussed in further detail below with reference to FIGS. 6A, 6B, 6C, 6D, and 6E that describe a representative assembly process for the streetlight mounting system 100. In various embodiments, the assembly and installation may be performed manually, automatically by machine, or with a combination of manual and mechanized actions, for example.

Certain steps in the processes described herein may naturally precede others for the present technology to function appropriately. However, the present technology is not limited to the order of the steps described if such order or sequence does not alter the functionality of the present technology to the level of rendering the technology inoperative or nonsensical. That is, it is recognized that some steps may be performed before or after other steps or in parallel with other steps without departing from the scope and spirit of the present technology.

Figure 6A:
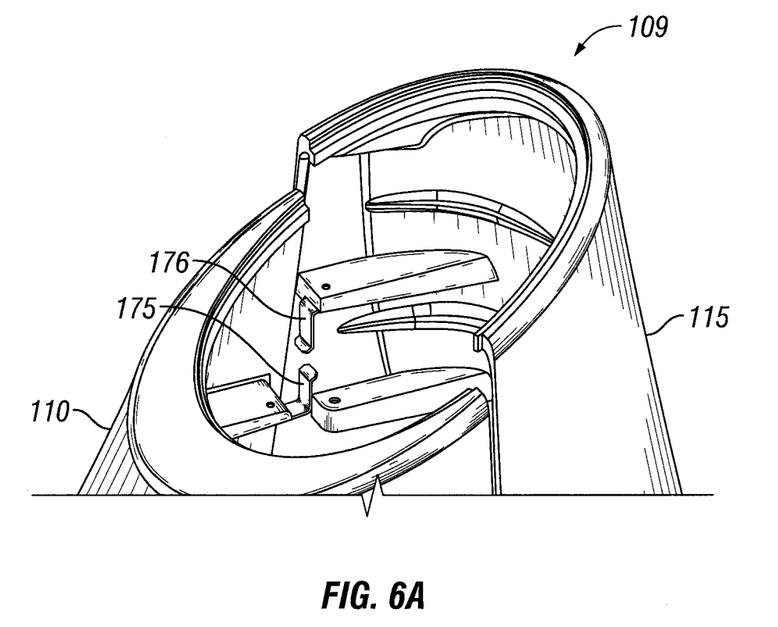
FIGS. 6A, 6B, 6C, 6D, and 6E (collectively FIG. 6) describe a representative assembly process for the streetlight mounting system in which representative clips engage with one another to urge two collar sections together, around the streetlight pole, according to some example embodiments of the present technology.

In a typical installation, the base 125 is attached to the surface 140 (see FIG. 1) using bolts or other appropriate means. Next, the streetlight pole 105 is attached to the base 125 as discussed above. Then, the collar 109 may be assembled around the streetlight pole 105 and attached to the base 125 as shown in FIG. 6 and discussed below. Different sequences or processes may be utilized in various embodiments leading up to the steps shown in FIG. 6, for example. FIG. 6D illustrates a representative flowchart for an assembly process 600, while FIGS. 6A, 6B, 6C, and 6E illustrate physical elements and orientations associated with the assembly process 600.

The following discussion of the process 600 will refer to certain illustrated elements. However, those of skill in the art will appreciate that various embodiments of process 600 can function with and/or accommodate a wide range of devices, systems, and hardware (including elements illustrated in other figures as well as elements not expressly illustrated) and can function in a wide range of applications and situations. Accordingly, such referenced elements are exemplary, are provided without being exhaustive and without limitation, and are among many others supported by the present technology.

At block 610 of process 600 the collar section 110 (which may be viewed as the street-side collar) is attached or locked down to the base 125 using the collar mounting bolts 205 as discussed above with reference to FIGS. 2 and 5, inter alia. As also discussed above, a system of locating features facilitates aligning the collar section 110 with the base 125. Once the collar section 110 is secured to the base 125, the collar section 115 (which may be viewed as the house-side collar) slides vertically down into position, for example as guided by installation personnel. As illustrated in FIG. 6A, as the collar section 115 lowers, the clip 176, which is attached to the collar section 115, moves towards the clip 175, which is attached to the collar section 110.

Figure 6B:
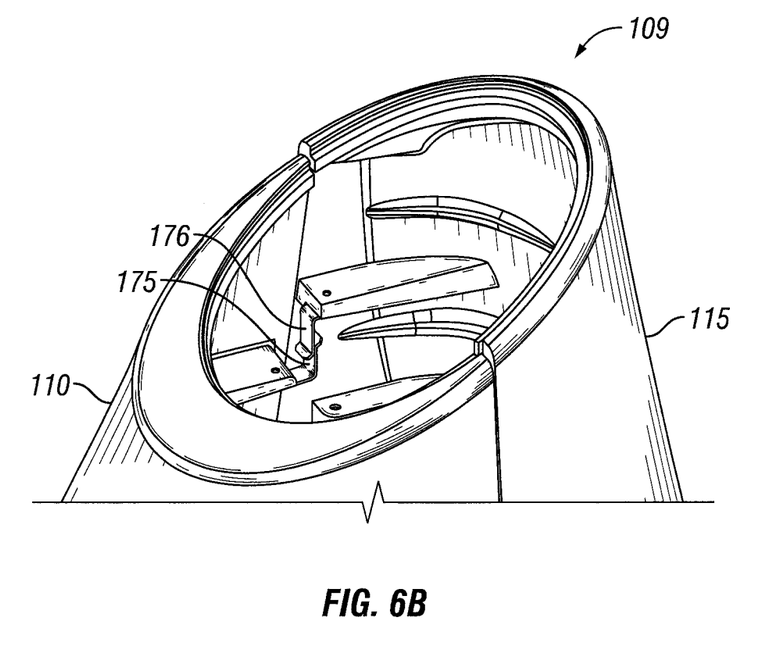

At block 620 of process 600 and as illustrated in corresponding FIG. 6B, the clips 175, 176 engage as the collar section 115 is further lowered towards the base 125. The clip engagement urges the collar sections 110, 115 together around the streetlight pole 105 (which is eliminated in FIG. 6 for visibility).

Figure 6C:
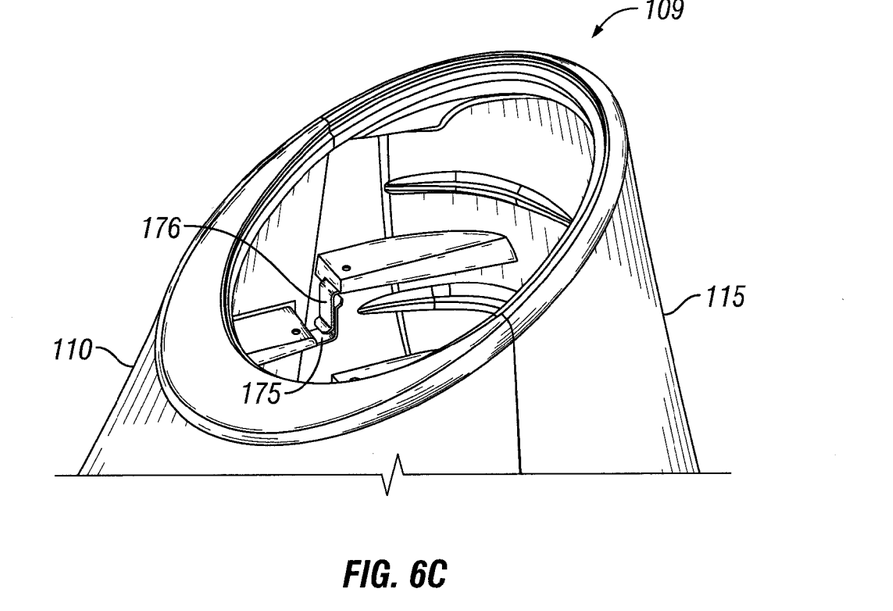
Figure 6D:
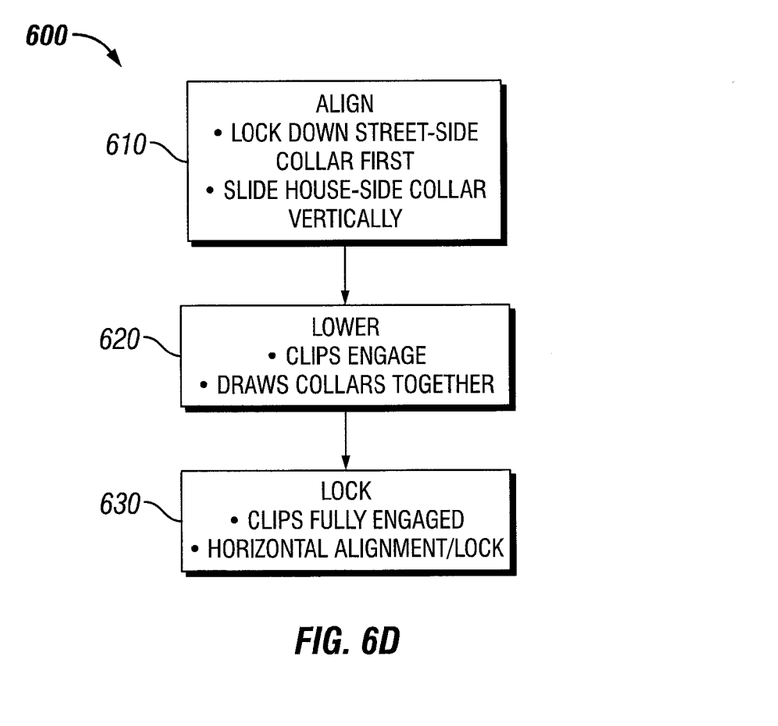
Figure 6E:
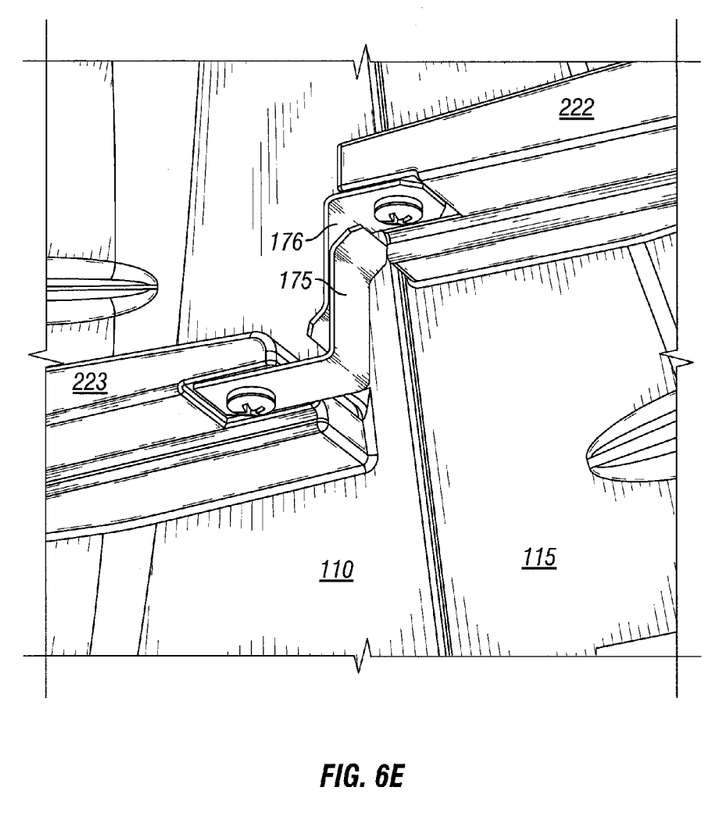

At block 630 and as illustrated in corresponding FIGS. 6C and 6E, the clips 175, 176 are fully engaged, with spring force of the clips 175, 176 closing the collar sections 110, 115 around the streetlight pole 105. As discussed above with reference to FIGS. 2 and 5, inter alia, a system of locating features facilities proper alignment of the collar section 115 onto the base 125 as the collar section 115 is lowered.

Once the collar section 115 is positioned and the clips 175, 176 are engaged, the installer typically utilizes a ratchet wrench 505 or other appropriate tool or machine to tighten the collar mounting bolts 205. When the system of fasteners holding the base 125, the streetlight pole 105, and the collar sections 110, 115 are in place, the installer may close the door 130 and tighten the screw 135, thereby placing the streetlight mounting system 100 and the streetlight in an operational configuration.

Figure 7A:
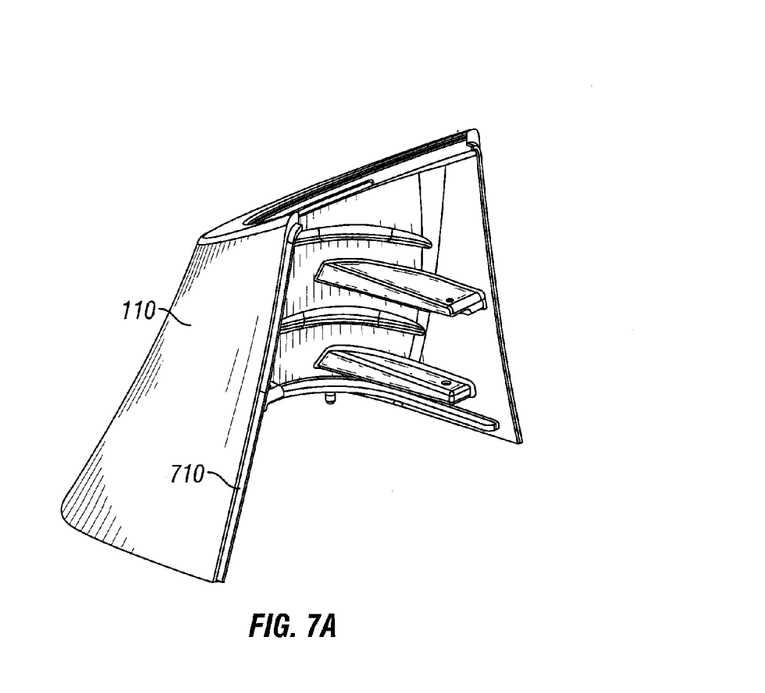
FIGS. 7A and 7B (collectively FIG. 7) illustrate water shedding features between the two collar sections of the streetlight mounting system according to some example embodiments of the present technology.
Figure 7B:
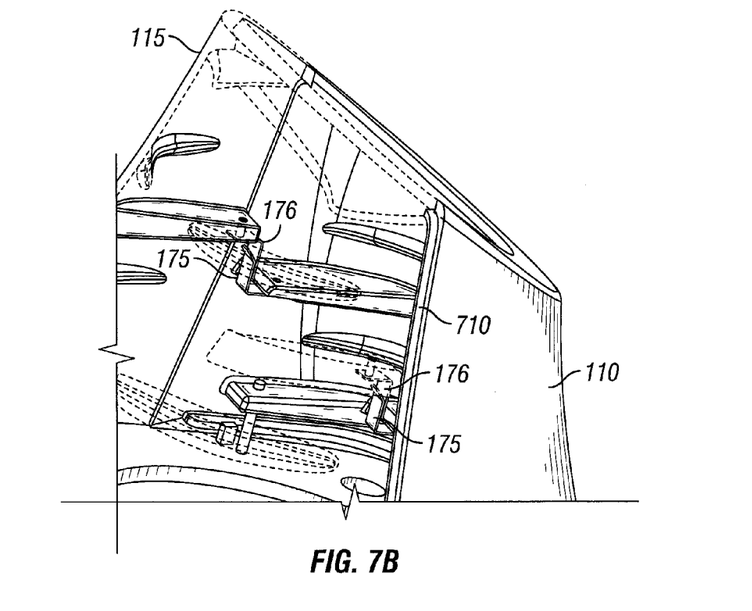

Referring now to FIG. 7, FIGS. 7A and 7B illustrate water shedding features between the two collar sections 110, 115 of the streetlight mounting system 100. One of the two collar sections 110, 115 overlaps the other at a juncture 710 where the two collar sections 110, 115 meet. In some embodiments, gasket material may be deployed at the juncture 710 for supplemental environmental protection. In certain embodiments, such gasket material is located in a groove in one or both of the collar sections 110, 115. In FIG. 7B, the collar section 115 is rendered substantially transparent to promote reader visualization.

Figure 8A:
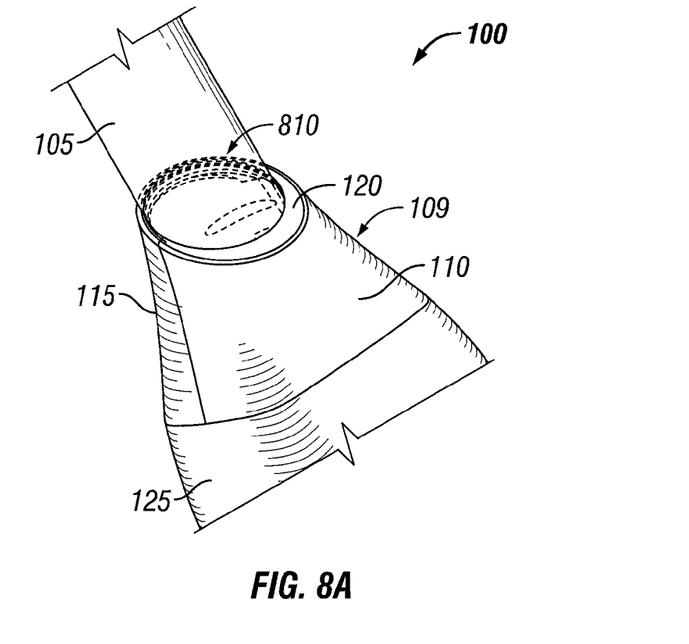
FIGS. 8A and 8B (collectively FIG. 8) illustrate water shedding features between the streetlight pole and the two collar sections of the streetlight mounting system according to some example embodiments of the present technology.
Figure 8B:
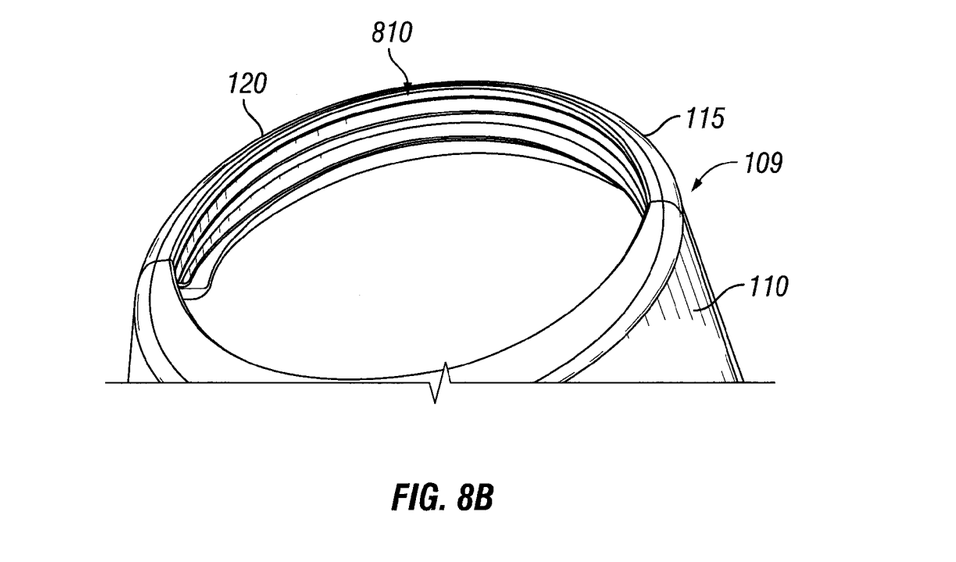

FIGS. 8A and 8B illustrate water shedding features between the streetlight pole 105 and the two collar sections 110, 115 of the streetlight mounting system 100. In the illustrated embodiment, the collar sections 110, 115 comprise a channel in which gasket material 810 is disposed. The gasket material 810 thus circumscribes the streetlight pole 105 to block entry of water into the enclosure. The gasket material 810 may be formed of silicone or other suitable material, for example.

Technology for mounting streetlights has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A streetlight mounting system comprising:
   a base comprising:
      a lower portion operable to attach to a surface adjacent an area to be illuminated; and
      an upper portion operable to attach to a streetlight pole; and
   a collar system comprising:
      a first collar section that arches adjacent a first circumferential portion of the streetlight pole;
      a second collar section that arches adjacent a second circumferential portion of the streetlight pole;
      a first clip attached to the first collar section; and
      a second clip attached to the second collar section,
      wherein the first clip and the second clip are configured to engage one another to urge the first collar section and the second collar section together about the streetlight pole.

2. The streetlight mounting system of claim 1, wherein the first clip and the second clip are L-shaped and comprise spring steel.

3. The streetlight mounting system of claim 1, wherein the first collar section comprises a first groove adjacent the first circumferential portion of the streetlight pole,
   wherein the second collar section comprises a second groove adjacent the second circumferential portion of the streetlight pole, and
   wherein the streetlight mounting system further comprises gasket material disposed in the first and second grooves.

4. The streetlight mounting system of claim 3, wherein the first collar section and the second collar section adjoin one another along a vertically extending juncture at which the first collar section overlaps the second collar section.

5. The streetlight mounting system of claim 1, wherein the base comprises at least one protrusion, and
   wherein the first collar section comprises at least one aperture sized to receive the at least one protrusion for aligning the first collar section with the base.

6. The streetlight mounting system of claim 5, wherein the base comprises at least one more protrusion, and
   wherein the second collar section comprises at least one more aperture sized to receive the at least one more protrusion for aligning the second collar section with the base.

7. The streetlight mounting system of claim 1, wherein the first and second collar sections comprise a plurality of protrusions, and
   wherein the base comprises a plurality of apertures sized according to the plurality of protrusions for aligning the first and second collar sections with the base.

8. The streetlight mounting system of claim 1, wherein an uppermost portion of the first collar section and an uppermost portion of the second collar section collectively circumscribe the streetlight pole at an acute angle relative to an axis of the streetlight pole.

9. The streetlight mounting system of claim 8, wherein the acute angle is operable to shed water.

10. The streetlight mounting system of claim 1, wherein when the streetlight mounting system is in an operational configuration, all fasteners that couple the first collar section, the second collar section, the base, and the streetlight pole together are hidden from view.

11. The streetlight mounting system of claim 1, wherein first bolts that are accessible through a door of the base are configured for fastening the streetlight pole to the upper portion of the base,
   wherein second bolts that are accessible through the door of the base are configured for fastening the collar system to the upper portion of the base, and
   wherein the first collar section and the second collar section comprise inward facing ribs that enhance structural integrity.

12. A streetlight mounting system comprising:
   a base comprising:
      a lower portion operable to attach to a street side surface; and
      an upper portion operable to attach to a lower end of a streetlight pole; and
   a collar extending upward from the upper portion of the base and tapering towards the streetlight pole, an uppermost portion of the collar circumscribing the streetlight pole at an acute angle relative to an axis of the streetlight pole, the collar comprising:
      a first section curving past a first circumferential portion of the streetlight pole; and
      a second section curving past a second circumferential portion of the streetlight pole,
   wherein the first section and the second section collectively circumscribe the streetlight pole,
   wherein a system of protrusions and apertures align the first and second sections to the upper portion of the base, and
   wherein the first section and the second section each comprises inward facing ribs extending horizontally.

13. The streetlight mounting system of claim 12, wherein the acute angle is operable to shed water.

14. The streetlight mounting system of claim 12, wherein when the streetlight mounting system is in an operational configuration, all fasteners that couple the first section, the second section, the base, and the streetlight pole together are hidden from view.

15. A streetlight mounting system comprising:
   a base comprising:
      a lower portion operable to attach to a street side surface; and
      an upper portion operable to attach to a lower end of a streetlight pole; and
   a collar extending upward from the upper portion of the base and tapering towards the streetlight pole, an uppermost portion of the collar circumscribing the streetlight pole at an acute angle relative to an axis of the streetlight pole, the collar comprising:
      a first section curving past a first circumferential portion of the streetlight pole; and
      a second section curving past a second circumferential portion of the streetlight pole,
   wherein the collar further comprises:
      a first clip attached to the first section; and
      a second clip attached to the second section, and
   wherein the first clip and the second clip are configured to engage one another to urge the first section and the second section together about the streetlight pole.

16. A streetlight mounting system comprising:
   a base comprising:
      a bottom that attaches to a surface; and
      a top that attaches to a proximal end of a streetlight pole;
   a collar extending around the streetlight pole and tapering from the top of the base to the streetlight pole; and
   a fastener system that holds the base, the streetlight pole, and the collar together; that is hidden from view when the streetlight mounting system is in an operational configuration; and that comprises:

first fasteners holding the streetlight pole to the base;
second fasteners holding the collar to the base; and
third fasteners holding the collar around the streetlight pole.

17. The streetlight mounting system of claim 16, wherein the base comprises a door,
wherein the door provides access to the first fasteners, the second fasteners, and the third fasteners,
wherein the third fasteners comprise a first clip and a second clip,
wherein the collar comprises:
a first section that extends partially about the streetlight pole and that comprises the first clip; and
a second section that extends partially about the streetlight pole and that comprises the second clip, and
wherein the first clip and the second clip are configured to engage one another to urge the first collar section and the second collar section together about the streetlight pole.

18. The streetlight mounting system of claim 16, wherein the first fasteners comprise first bolts,
wherein the second fasteners comprise second bolts, and
wherein the third fasteners comprise clips that urge sections of the collar together.

\* \* \* \* \*